(12) United States Patent
Lin et al.

(10) Patent No.: US 12,592,072 B1
(45) Date of Patent: Mar. 31, 2026

(54) IMAGE RECOGNITION METHOD FOR SECONDARY CIRCUIT TERMINAL BASED ON CONTRASTIVE LEARNING AND IMPROVED CRNN

(71) Applicant: Sanmen Nuclear Power Co., Ltd., Zhejiang (CN)

(72) Inventors: Qiuyang Lin, Taizhou (CN); Congwei Wang, Taizhou (CN); Luyi Zhang, Taizhou (CN); Jiaqi Liu, Taizhou (CN)

(73) Assignee: Sanmen Nuclear Power Co., Ltd., Taizhou (CN)

( * ) Notice: Subject to any disclaimer, the term of this patent is extended or adjusted under 35 U.S.C. 154(b) by 0 days.

(21) Appl. No.: 19/303,043

(22) Filed: Aug. 18, 2025

Related U.S. Application Data

(63) Continuation of application No. 19/271,194, filed on Jul. 16, 2025, which is a continuation-in-part of
(Continued)

(30) Foreign Application Priority Data

Nov. 21, 2024 (CN) .......................... 202411667581.4

(51) Int. Cl.
*G06V 10/82* (2022.01)
*G06N 3/044* (2023.01)
(Continued)

(52) U.S. Cl.
CPC ............. *G06V 10/82* (2022.01); *G06N 3/044* (2023.01); *G06N 3/0464* (2023.01); *G06V 10/72* (2022.01); *G06V 10/761* (2022.01); *G06V 10/764* (2022.01); *G06V 10/7715* (2022.01); *G06V 10/774* (2022.01); *G06V 20/62* (2022.01)

(58) Field of Classification Search
CPC ...... G06V 10/82; G06V 10/72; G06V 10/761; G06V 10/764; G06V 10/7715; G06V 10/774; G06V 20/62; G06N 3/044; G06N 3/0464
See application file for complete search history.

(56) References Cited

PUBLICATIONS

A Simple Framework, Chen et al 2020 (Year: 2020).*
Scene text recognition, Lei et al 2018 (Year: 2018).*
ECA-Net, Wang et al 2020 (Year: 2020).*

* cited by examiner

*Primary Examiner* — Jianxun Yang
(74) *Attorney, Agent, or Firm* — LOZA & LOZA, LLP; Michael F. Fedrick

(57) ABSTRACT

The present disclosure belongs to the technical field of health status assessment of secondary circuits in power systems, and specifically relates to an image recognition method for a secondary circuit terminal based on contrastive learning and an improved CRNN. The method includes: step 1: pre-training sample data of a secondary circuit terminal block of a power system through the contrastive learning; step 2: improving a feature extraction layer of a CRNN by using a residual neural network; and step 3: introducing an ECA-Net on the basis of the step 2 to construct a recognition model for the secondary circuit terminal based on the contrastive learning and the improved CRNN. In the method of the present disclosure, an image of the secondary circuit terminal block can be accurately recognized, and the accuracy of image recognition, detection accuracy and detection efficiency can be greatly improved.

11 Claims, 1 Drawing Sheet

Related U.S. Application Data application No. PCT/CN2024/136347, filed on Dec. 3, 2024.

(51) Int. Cl.

| | |
|---|---|
| *G06N 3/0464* | (2023.01) |
| *G06V 10/72* | (2022.01) |
| *G06V 10/74* | (2022.01) |
| *G06V 10/764* | (2022.01) |
| *G06V 10/77* | (2022.01) |
| *G06V 10/774* | (2022.01) |
| *G06V 20/62* | (2022.01) |

IMAGE RECOGNITION METHOD FOR SECONDARY CIRCUIT TERMINAL BASED ON CONTRASTIVE LEARNING AND IMPROVED CRNN

CROSS-REFERENCE TO RELATED APPLICATIONS

The present disclosure is a continuation of U.S. patent application Ser. No. 19/271,194 filed on Jul. 16, 2025, which is a continuation-in-part of International Patent Application No. PCT/CN2024/136347 filed on Dec. 3, 2024, which claims priority to Chinese Patent Application No. 202411667581.4 filed on Nov. 21, 2024. The disclosures of the foregoing references are hereby incorporated by reference in their entireties.

TECHNICAL FIELD

The present disclosure belongs to the technical field of health status assessment of secondary circuits in power systems, and particularly relates to an image recognition method for a secondary circuit terminal based on contrastive learning and an improved CRNN.

BACKGROUND

In the secondary equipment of the power system, the terminal block is a key adapter component for signal transmission between measurement and control equipment and the electrical information collection points. The secondary signal wires from sampling points must correspond one-to-one with the markings on the terminal block. Whether the connection of its secondary signal wires is correct is of vital importance for the stability and safety of the system. During the maintenance of power system equipment, inspecting the correctness of the connection between the terminal block and the signal wires in the secondary circuit of the wiring cabinet involves a huge workload. Traditional identification methods rely on manual visual inspection, which is prone to errors such as false inspection and missed inspection. If feature recognition and information extraction can be automatically performed on the secondary circuit terminal block through image recognition technology, the intelligent operation and maintenance of the secondary circuit can be realized, providing fundamental support for the safe operation of the substation.

Therefore, it is urgent to develop an efficient and accurate method for recognizing the markings of the signal wires and terminal block in the secondary circuit to address the defects existing in the prior art.

SUMMARY

An objective of the present disclosure is to provide an image recognition method for a secondary circuit terminal based on contrastive learning and an improved convolutional recurrent neural network (CRNN). In the method, an image of the secondary circuit terminal block can be accurately recognized, and the accuracy of image recognition, detection accuracy and detection efficiency can be greatly improved.

Technical solutions for achieving the objective of the present disclosure:

An image recognition method for a secondary circuit terminal based on contrastive learning and an improved CRNN, including:

step 1: pre-training, by a server, sample data of a secondary circuit terminal block of a power system captured by using on-site equipment through the contrastive learning;

step 2: improving, by a server, a feature extraction layer of a CRNN by using a residual neural network; and step 3: introducing, by a server, an Efficient Channel Attention Network (ECA-Net) on the basis of the step 2 to construct a recognition model for the secondary circuit terminal based on the contrastive learning and the improved CRNN, and the recognition model for the secondary circuit terminal based on the contrastive learning and the improved CRNN is configured to recognize a secondary circuit terminal to be recognized captured by using on-site equipment.

The step 1 includes:

data augmentation: expanding data, by applying cropping, flipping, rotation, random noise adding, random Gaussian blur and color transformation techniques to unlabeled data, and data expanded from same-source data are used as similar sample pairs with each other, and remaining data are used as different sample pairs;

encoder network: mapping the similar sample pairs and the different sample pairs to a feature space, extracting a feature capable of distinguishing samples and similarity; and outputting a high-dimensional feature vector through an average pooling layer; and projection network: projecting the high-dimensional feature vector output by the encoder network to a low-dimensional space to obtain a feature vector output by the projection network.

A calculation formula of obtaining the feature vector output by the projection network in the step 1 is:

$$z_i' = g(h_i) = W^{(2)}\sigma\left(W^{(1)}h_i\right)$$

where, $z_i'$ is the feature vector output by the projection network; $h_i$ is the feature vector output by the average pooling layer; $W^{(1)}$ and $W^{(2)}$ are weight matrices of two fully connected layer neural networks in the projection network; and $\sigma(\cdot)$ is an activation function ReLU.

The step 1 further includes: constructing a loss function, pre-training the encoder through the loss function, so that the encoder is capable of extracting a key feature that distinguishes terminal block images, and outputting a high-quality feature embedding vector $X_1$ to obtain a trained encoder.

A calculation formula of the loss function is:

$$L_{i,j} = \lambda L_{NT} + (1 - \lambda)L^{sup}$$

where, $L_{i,j}$ is the loss function; $L_{NT}$ is a normalized temperature-scaled cross-entropy loss; $L^{sup}$ is an extended contrastive loss function; and $\lambda$ is a weighting parameter;

a calculation formula of the normalized temperature-scaled cross-entropy loss is:

$$L_{NT} = -\sum_{i=1}^{2N}\log\frac{\exp\left(\frac{sim(z_i \cdot z_{j(i)})}{\tau}\right)}{\sum_{g=1}^{2N}\Gamma_{g\neq i}\cdot\exp\left(\frac{sim(z_i \cdot z_g)}{\tau}\right)}$$

where, $L_{NT}$ is the normalized temperature-scaled cross-entropy loss; N is the total number of samples; $\Gamma(\cdot)$ is a binary function, and is 1 if a condition is met and 0 otherwise; $z_{j(i)}$ is a feature vector homologous to $z_i$, $z_g$ is a different type of feature vector from $z_i$, $\tau$ is a temperature parameter; both i and g are counting units; and sim$(\cdot)$ is cosine similarity;

a calculation formula of the extended contrastive loss function is:

$$L^{sup} = \sum_{i=1}^{2N} \frac{-1}{2N_{y_i} - 1} \sum_{j=1}^{2N} \Gamma_{i \neq j} \cdot \Gamma_{y_i = y_j} \cdot \log \frac{\exp\left(\frac{sim(z_i \cdot z_j)}{\tau}\right)}{\sum_{g=1}^{2N} \Gamma_{g \neq i} \cdot \exp\left(\frac{sim(z_i \cdot z_g)}{\tau}\right)}$$

where, $L^{sup}$ is the extended contrastive loss function; $N_{yi}$ is the number of samples with a label $y_i$; $z_j$ is a feature vector of the same type as $z_i$ but from a different source; i, g, j are all counting units; $\tau$ is the temperature parameter; $\Gamma(\cdot)$ is the binary function, and is 1 if the condition is met and 0 otherwise; and sim$(\cdot)$ is the cosine similarity; and a calculation formula of the cosine similarity is:

$$sim(z_i, z_j) = \frac{z_i^T z_j}{\|z_i\|\|z_j\|}$$

where, $z_i$ and $z_j$ are feature vectors that are output by two projection networks and then normalized.

The step 2 is specifically: transferring the trained encoder in the step 1 to an improved CRNN model as an initialization parameter of the feature extraction layer; and optimizing the feature extraction layer by using a residual neural network structure, and continuing supervised training with the contrastive learning loss function $L_{i,j}$ in the step 1 to further enhance a feature extraction capability of the model for the terminal block images and output a feature vector $X_2$.

A calculation formula of a residual unit in the residual neural network in the step 2 is:

$$r_l = p(s_l) + F(s_l, J_l)$$

$$s_{l+1} = R(r_l)$$

where, $s_l$ and $s_{l+1}$ represent an input and an output of an l-th residual unit, respectively; F represents a learned residual; J is a convolution operation; $r_l$ represents the residual unit; p is an identity mapping performed on the input signal $s_l$; R is an activation function of a rectified linear neural network; and $p(s_l) = s_l$ represents an identity mapping; and learned features from a shallow layer l to a deep layer L are:

$$s_L = s_l + \sum_{i=l}^{L-1} F(s_i, J_i)$$

where, $s_L$ represents an output of a residual unit in the deep layer L.

A calculation formula of a gradient for a backward process in the residual neural network in the step 2 is:

$$\frac{\partial loss}{\partial s_l} = \frac{\partial loss}{\partial s_L} \cdot \frac{\partial s_L}{\partial s_l} = \frac{\partial loss}{\partial s_L} \cdot \left(1 + \frac{\partial}{\partial s_l} \sum_{i=l}^{L-1} F(s_i, J_i)\right)$$

where, $$\frac{\partial loss}{\partial s_l}$$

represents a gradient of the loss function reaching the l, a first factor $$\frac{\partial loss}{\partial s_L}$$

represents a gradient of the loss function reaching the L, $$\frac{\partial s_L}{\partial s_l}$$

represents a gradient of the deep layer L reaching the shallow layer l, and $$\frac{\partial}{\partial s_l} \sum_{i=l}^{L-1} F(s_i, J_i)$$

represents a gradient of a sum of residuals learned from the layer l to a layer L-1 with respect to the l, and The step 3 is specifically: introducing the ECA-Net on the basis of the feature vector $X_2$ output in the step 2, adaptively assigning a weight to each feature channel to obtain an improved feature vector $X_3$, and subjecting the improved feature vector $X_3$ to sequence modeling and context information processing via a recurrent layer of the CRNN to finally complete feature classification and text recognition tasks.

A calculation formula of a channel weight in the efficient channel attention network in the step 3 is:

$$\omega = \sigma(Mq)$$

where, $\omega$ is the channel weight; $\sigma$ is a Sigmoid function; and M is a C×C parameter matrix; and $$\omega = \sigma(C1D_k(q))$$

where, C1D is a 1-dimensional convolution operation; and k is a convolution kernel size.

A calculation formula of the convolution kernel size in the efficient channel attention network in the step 3 is:

$$k = \psi(C) = \left|\frac{\log_2(C)}{\gamma} + \frac{f}{\gamma}\right|_{odd}$$

where, k is the convolution kernel size; $|t|_{odd}$ represents a nearest odd number to t; C is a channel dimension; and both f and $\gamma$ are constants.

The beneficial technical effects of the present disclosure are as follows:

1. in the image recognition method for a secondary circuit terminal based on contrastive learning and an improved CRNN provided by the present disclosure, by introducing the contrastive learning, effective pre-training can be performed using unlabeled data or a small amount of labeled data without relying on a large amount of labeled data, thereby improving the sample feature representation ability.

2. in the image recognition method for a secondary circuit terminal based on contrastive learning and an improved CRNN provided by the present disclosure, through the "shortcut connection" between the front and back layers established by the ResNet residual neural network, the speed of gradient backpropagation is accelerated, the problem of gradient vanishing is effectively solved, and efficient feature extraction is achieved with relatively low complexity. The extracted feature maps retain the key information of the terminal block images. At the same time, the stability of deep network training is ensured through identity mapping and skip connections.

3. in the image recognition method for a secondary circuit terminal based on contrastive learning and an improved CRNN provided by the present disclosure, by introducing the ECA-Net, the model is enabled to achieve better results in fine-grained feature capture and overall feature fusion, thereby effectively improving the recognition accuracy of the terminal block images. The ECA-Net aggregates convolutional features through global average pooling, and then adopts one-dimensional convolution and the Sigmoid activation function to establish the dependency relationships among channels without performing dimensionality reduction operations, thereby reducing the computational complexity and the number of parameters of the model.

4. in the image recognition method for a secondary circuit terminal based on contrastive learning and an improved CRNN provided by the present disclosure, first the secondary circuit terminal to be recognized is captured by using on-site equipment (such as high-definition cameras or industrial cameras) to obtain raw image data and the captured image data is sent to a server. These image data include terminal images under various working conditions, encompassing different angles, lighting, and noise environments. Subsequently, the captured image data undergo preprocessing by the server to remove noise and enhance image quality before being input into the recognition model for the secondary circuit terminal based on the contrastive learning and the improved CRNN according to the present disclosure, to obtain a secondary circuit terminal recognition result which can be used to inspect the correctness of the connection between the terminal block and the signal wires in the secondary circuit of the wiring cabinet. This model employs contrastive learning technology to pre-training on limited labeled samples, maximizing the use of unlabeled data or a small amount of labeled data for feature learning, thereby improving the recognition capability of terminal images. During the recognition phase, the server can automatically extract key features of the terminal images and perform image recognition operations by the model, enabling rapid and accurate determination of terminal status, thereby providing effective support for equipment maintenance and fault diagnosis.

DESCRIPTION OF THE EMBODIMENTS

The present disclosure will be further described in detail below in conjunction with the drawings and embodiments.

An image recognition method for a secondary circuit terminal based on contrastive learning and an improved Convolutional Recurrent Neural Network (CRNN), specifically including the following steps:

step 1: pre-training sample data of a secondary circuit terminal block of a power system through the contrastive learning;

in this step, after pre-training sample data of a secondary circuit terminal block of a power system through the contrastive learning, optimized sample feature embedding vectors are output. These embedding vectors are high-dimensional feature representations of samples, which can better reflect similarity and a difference among the samples after the comparative learning.

When automatically identifying and detecting terminal block markings and line numbers of a secondary circuit, it is necessary to perform image pre-training on different types of terminal blocks. However, since some terminal blocks may include dozens or even hundreds of terminals, it takes a lot of time to label these samples manually. Therefore, the contrastive learning method is introduced. In the method, effective pre-training can be performed using unlabeled data or a small amount of labeled data without relying on a large amount of labeled data. The core of the contrastive learning method is a machine learning approach that improves the sample feature representation ability by minimizing the distance between similar samples to bring samples of the same type closer in a feature space, and maximizing the distance between different samples to cause samples of different types to move away from each other in the feature space. This method consists of three parts: data augmentation, an encoder network, and a projection network.

Figure 1:
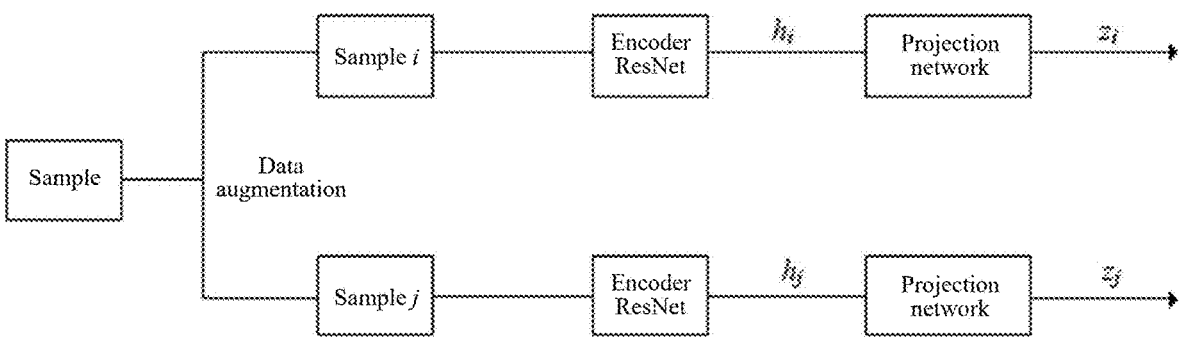
FIG. 1 is a flow chart of pre-training sample data of a secondary circuit terminal block of a power system through contrastive learning according to the method of the present disclosure; and FIG. $\lambda$ is a structural diagram of an image recognition model for a secondary circuit terminal based on contrastive learning and an improved CRNN according to the present disclosure.

The contrastive learning process starts with data augmentation. Data are expanded by applying cropping, flipping, rotation, random noise adding, random Gaussian blur and color transformation techniques to unlabeled data. These data expanded from same-source data are used as similar sample pairs with each other, and remaining data are used as different sample pairs. The encoder network maps the similar sample pairs and the different sample pairs to a feature space, and extracts a feature capable of distinguishing samples and similarity, i.e., a feature that can play a key role in performance of a model in a task, is closely related to a target, and has a strong discrimination ability. Selection of an encoder is of vital importance for feature extraction performance. The encoder is generally a deep neural network that outputs a high-dimensional feature vector through an average pooling layer. The projection network is composed of fully connected layers, which projects the high-dimensional feature vector output by the encoder into a low-dimensional space, reducing data complexity and redundancy, helping to quantify sample similarity and supporting subsequent tasks. The flow chart is shown in FIG. 1.

A feature vector output by the projection network is as follows:

$$z_i' = g(h_i) = W^{(2)}\sigma\left(W^{(1)}h_i\right) \qquad \text{formula 1}$$

Where, $z_i'$ is the feature vector output by the projection network; $h_i$ is the feature vector output by the average pooling layer; $W^{(1)}$ and $W^{(2)}$ are weight matrices of two fully connected layer neural networks in the projection network; and $\sigma(\cdot)$ is an activation function ReLU.

After passing through the above three parts, the network will quantify and compare, through cosine similarity, similarity between two feature vectors output by the projection network, thereby helping distinguish between the similar sample pairs and the different sample pairs, enabling the model to effectively learn the feature that can distinguish different sample categories. A formula of the cosine similarity is:

$$sim(z_i, z_j) = \frac{z_i^T z_j}{\|z_i\|\|z_j\|} \qquad \text{formula 2}$$

where, $z_i$ and $z_j$ are feature vectors that are output by two projection networks and then normalized.

The contrastive learning guides the model to distinguish similarity of samples by constructing a loss function, and maximizes feature vector similarity of similar samples by minimizing the contrastive loss function value. Therefore, choosing an appropriate loss function is of vital importance. Herein, normalized temperature-scaled cross-entropy loss (NT-Xent) is adopted as the contrastive loss function, and its formula is:

$$L_{NT} = -\sum_{i=1}^{2N} \log \frac{\exp\left(\dfrac{sim(z_i \cdot z_{j(i)})}{\tau}\right)}{\displaystyle\sum_{g=1}^{2N} \Gamma_{g\neq i} \cdot \exp\left(\dfrac{sim(z_i \cdot z_g)}{\tau}\right)} \qquad \text{formula 3}$$

where, $L_{NT}$ is the normalized temperature-scaled cross-entropy loss; N is the total number of samples; $\Gamma(\cdot)$ is a binary function, and is 1 if a condition is met and 0 otherwise; $z_{j(i)}$ is a feature vector homologous to $z_i$; $z_g$ is a different type of feature vector from $z_i$; and $\tau$ is a temperature parameter. Both i and g are components of a $\Sigma$ function, and are counting units, without physical meanings (for example:

$$\sum_{i=1}^{n} i = 1 + 2 + \ldots + n^{\overset{n}{\underset{i=1}{\Sigma} i = 1+2+\ldots+n}} );$$

and $\Gamma_{g\neq i}$, $\Gamma_{g\neq j}$ is a binary function when g≠i.

The normalized temperature-scaled cross-entropy loss can effectively distinguish between the similar sample pairs and the different sample pairs, but has relatively weak identification ability for samples with the same type but from different sources. Therefore, an extended contrastive loss function is used herein to consider differences among these samples, and its formula is:

$$L^{sup} = \sum_{i=1}^{2N} \frac{-1}{2N_{y_i} - 1} \sum_{j=1}^{2N} \Gamma_{i\neq j} \cdot \Gamma_{y_i = y_j} \cdot \log \frac{\exp\left(\dfrac{sim(z_i \cdot z_j)}{\tau}\right)}{\displaystyle\sum_{g=1}^{2N} \Gamma_{g\neq i} \cdot \exp\left(\dfrac{sim(z_i \cdot z_g)}{\tau}\right)} \qquad \text{formula 4}$$

where, $L^{sup}$ is the extended contrastive loss function; $N_{y_i}$ is the number of samples with a label $y_i$; and $z_j$ is a feature vector of the same type as $z_i$ but from a different source. j is a component of the $\Sigma$ function, and is a counting unit, without a physical meaning; $\Gamma_{i\neq j}$ is a binary function when i≠j; and $\Gamma_{y_i=y_j}$ is a binary function when $y_i\neq y_j$; and the above loss function is weighted and summed with the cross-entropy loss:

$$L_{i,j} = \lambda L_{NT} + (1 - \lambda)L^{sup} \qquad \text{formula 5}$$

where, $\lambda$ is a weighting parameter. $L_{i,j}$ is a loss function.

The encoder is pre-trained using the loss function $L_{i,j}$, so that the encoder is capable of extracting a key feature that distinguishes terminal block images, and outputting a high-quality feature embedding vector $X_1$ to obtain a trained encoder, providing a basis for training in the next step.

step 2: improving a feature extraction layer of a CRNN by using a residual neural network.

The trained encoder in the step 1 is transferred to an improved CRNN model as an initialization parameter of the feature extraction layer, thereby inheriting pre-trained feature knowledge. The feature extraction layer is optimized by using a residual neural network (ResNet) structure, and supervised training is continued with the contrastive learning loss function $L_{i,j}$ in the step 1 to further enhance a feature extraction capability of the model for the terminal block images and output a feature vector $X_2$.

The residual neural network (ResNet) addresses the issue of gradient vanishing by establishing a "shortcut connection" between the front and back layers, which accelerates the speed of gradient backpropagation. Compared with other neural networks, ResNet has lower complexity and higher computational efficiency at the same depth. This makes ResNet more flexible and practical in practical applications. Therefore, ResNet is used herein to extract feature maps from input images.

A residual unit in the residual neural network can be expressed as:

$$r_l = p(s_l) + F(s_l, J_l) \qquad \text{formula 6}$$

$$s_{l+1} = R(r_l) \qquad \text{formula 7}$$

where, $s_l$ and $s_{l+1}$ represent an input and an output of an l-th residual unit, respectively, F represents a learned residual, J is a convolution operation, and $p(s_l)=s_l$ represents an identity mapping, and R is an activation function of a rectified linear neural network. $r_l$ represents a residual unit; and p is an identity mapping performed on the input signal $s_l$.

According to the above equations, learned features from a shallow layer 1 to a deep layer L can be obtained:

$$S_L = S_l + \sum_{i=l}^{L-1} F(s_i, J_i) \qquad \text{formula 8}$$

where, $s_L$ represents an output of a residual unit at the deep layer L.

Using the chain rule, a gradient for a backward process can be obtained:

$$\frac{\partial \text{loss}}{\partial s_l} = \frac{\partial \text{loss}}{\partial s_L} \cdot \frac{\partial s_L}{\partial s_l} = \frac{\partial \text{loss}}{\partial s_L} \cdot \left(1 + \frac{\partial}{\partial s_l} \sum_{i=l}^{L-1} F(s_i, J_i)\right) \qquad \text{formula 9}$$

where, a first factor $$\frac{\partial \text{loss}}{\partial s_L}$$

represents a gradient of the loss function reaching the L, $$\frac{\partial \text{loss}}{\partial s_l}$$

represents a gradient of the loss function reaching the l, $$\frac{\partial s_L}{\partial s_l}$$

represents a gradient from the deep layer L to the shallow layer $$l, \frac{\partial}{\partial s_l} \sum_{i=l}^{L-1} F(s_i, J_i)$$

represents a gradient of a sum of residuals learned from the layer 1 to a layer L-1 with respect to the l, and 1 in parentheses indicates that a skip connection can propagate a gradient without loss, and the other residual gradient (i.e., $$\frac{\partial}{\partial s_l} \sum_{i=l}^{L-1} F(s_i, J_i)\right)$$

needs to be processed by a layer with a weight, and the gradient is not directly transmitted.

Through the improvement in the step 2, the problem of gradient vanishing is effectively solved by using a residual structure of the ResNet, and efficient feature extraction is realized at relatively low complexity. The extracted feature maps retain the key information of the terminal block images. At the same time, the stability of deep network training is ensured through identity mapping and skip connections. The output of the step 2 is an image feature vector $X_2$ processed by an improved feature extraction layer, and these features will be used as an input for step 3.

step 3: introducing an Efficient Channel Attention Network (ECA-Net) on the basis of the step 2 to construct a recognition model for the secondary circuit terminal based on the contrastive learning and the improved CRNN.

In a data collection process, the captured images may lack distinctive features. As a result, the ResNet network may extract invalid features during training, thereby affecting the overall performance of the model. In order to further strengthen the correlation between features, in the step 3, based on the feature vector $X_2$ output in the step 2, the ECA-Net is introduced. By adaptively assigning weights, key feature channels are highlighted, enabling the model to achieve better results in fine-grained feature capture and overall feature fusion, and ultimately achieving the goal of high-precision recognition of terminal block images.

As an efficient channel attention module, the ECA-Net involves relatively few parameters and can improve the performance of the model. The ECA-Net aggregates convolutional features through global average pooling, and then adopts one-dimensional convolution and the Sigmoid activation function to establish the dependency relationships among channels without performing dimensionality reduction operations, thereby reducing the computational complexity and the number of parameters of the model.

First, for a given aggregate feature $q \in R^C$ (where C is the number of channels), an attention channel weight is learned in the following way:

$$\omega = \sigma(Mq) \qquad \text{formula 10}$$

where, $\omega$ is the channel weight; $\sigma$ is a Sigmoid function; and M is a C×C parameter matrix:

$$M = \begin{cases} M_{var2} = \begin{vmatrix} \omega^{1,1} & \cdots & 0 \\ \vdots & \ddots & \vdots \\ 0 & \cdots & \omega^{C,C} \end{vmatrix} \\ M_{var3} = \begin{vmatrix} \omega^{1,1} & \cdots & \omega^{1,C} \\ \vdots & \ddots & \vdots \\ \omega^{1,C} & \cdots & \omega^{C,C} \end{vmatrix} \end{cases} \qquad \text{formula 11}$$

In order to further improve model performance, the ECA module allows all channels to share the same learning parameters, thereby reducing computational complexity. This sharing is achieved through one-dimensional convolution:

$$\omega = \sigma(C1D_k(q)) \qquad \text{formula 12}$$

where, C1D is a 1-dimensional convolution operation which core parameter is a convolution kernel size k. Through experiments and experience, when k=3, the model has relatively low complexity and optimal results.

Second, the core of the ECA-Net module lies in cross-channel interaction, so it is necessary to determine the coverage range of interaction information. Since the interaction range is proportional to a channel dimension C, the following mapping relationship exists:

$$C = \phi(k) \qquad \text{formula 13}$$

The simplest way of mapping is a linear function $\phi(k) = \gamma*k - f$ $\phi(k) = \gamma*k - f$. However, considering the limitations of features and the fact that the channel dimension is generally an exponential multiple of 2, the ECA-Net adopts an exponential function with a base 2 to represent a non-linear mapping relationship:

$$C = \phi(k) = 2^{(\gamma*k - f)} \qquad \text{formula 14}$$

where, both f and $\gamma$ are constants, generally f=1 and $\gamma$=2. k is the convolution kernel size.

Given the channel dimension C, the convolution kernel size k can be calculated:

$$k = \psi(C) = \left| \frac{\log_2(C)}{\gamma} + \frac{f}{\gamma} \right|_{odd} \qquad \text{formula 15}$$

where, $|t|_{odd}$ represents a nearest odd number to t.

Figure 2:
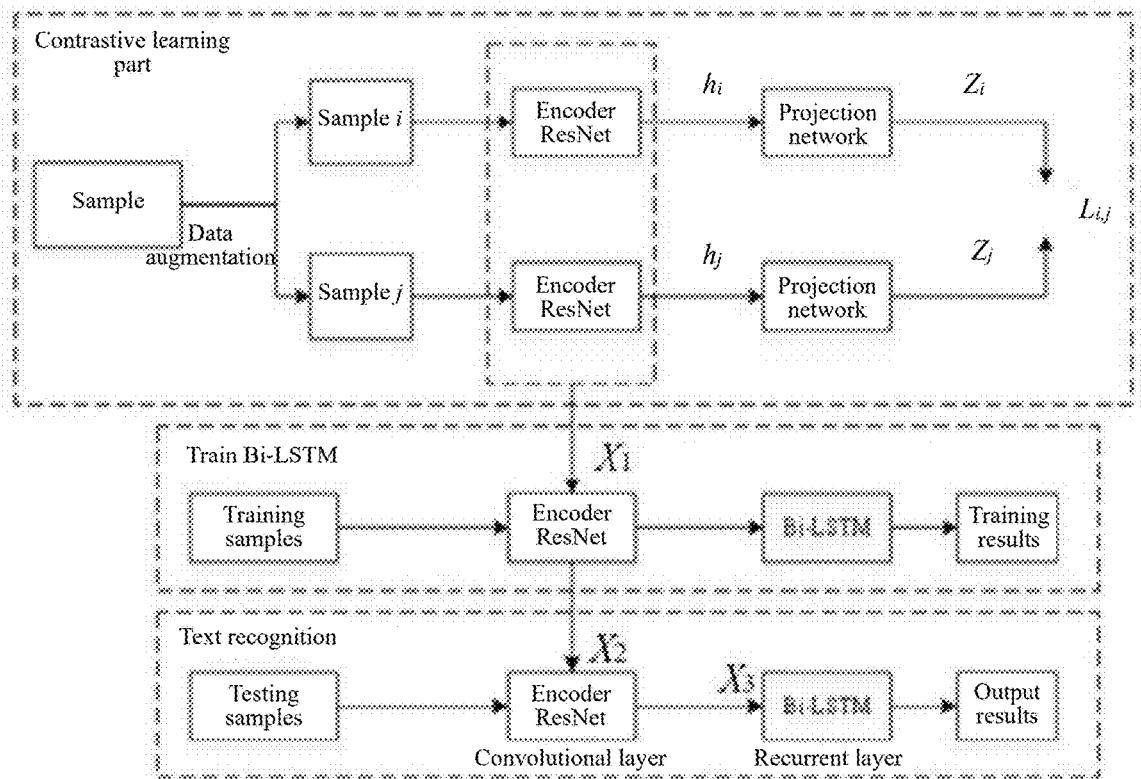

By introducing the ECA-Net, a weight is adaptively assigned to each feature channel, enhancing a contribution of a key channel to a final decision of the model. Then, the improved feature vector $X_3$ is subject to sequence modeling and context information processing via a recurrent layer of the CRNN to finally complete feature classification and text recognition tasks. Thus, a complete image recognition model is constructed, as shown in FIG. 2.

The present disclosure has been described in detail above in combination with the drawings and embodiments. However, the present disclosure is not limited to the above embodiments. Within the scope of knowledge possessed by those of ordinary skill in the art, various alterations can be made without departing from the purpose of the present disclosure. The prior art can be adopted for the content not described in detail in the present disclosure.

What is claimed is:

1. An image recognition method for a secondary circuit terminal based on contrastive learning and an improved CRNN, comprising:

step 1: pre-training sample data of a secondary circuit terminal block of a power system through the contrastive learning;

step 2: improving a feature extraction layer of a Convolutional Recurrent Neural Network (CRNN) by using a residual neural network; and step 3: introducing an Efficient Channel Attention Network (ECA-Net) on the basis of the step 2 to construct a recognition model for the secondary circuit terminal based on the contrastive learning and the improved CRNN, wherein the step 1 comprises:

data augmentation: expanding data, by applying cropping, flipping, rotation, random noise adding, random Gaussian blur and color transformation techniques to unlabeled data, wherein data expanded from same-source data are used as similar sample pairs with each other, and remaining data are used as different sample pairs;

encoder network: mapping the similar sample pairs and the different sample pairs to a feature space, extracting a feature capable of distinguishing samples and similarity, and outputting a high-dimensional feature vector through an average pooling layer; and projection network: projecting the high-dimensional feature vector output by the encoder network to a low-dimensional space to obtain a feature vector output by the projection network.

2. The image recognition method for a secondary circuit terminal based on contrastive learning and an improved CRNN according to claim 1, wherein a calculation formula of obtaining the feature vector output by the projection network in the step 1 is:

$$z_i' = g(h_i) = W^{(2)}\sigma\left(W^{(1)}h_i\right)$$

wherein, $z_i'$ is the feature vector output by the projection network; $h_i$ is the feature vector output by the average pooling layer; $W^{(1)}$ and $W^{(2)}$ are weight matrices of two fully connected layer neural networks in the projection network; and $\sigma(\cdot)$ is an activation function ReLU.

3. The image recognition method for a secondary circuit terminal based on contrastive learning and an improved CRNN according to claim 1, wherein the step 1 further comprises: constructing a loss function, pre-training the encoder through the loss function, so that the encoder is capable of extracting a key feature that distinguishes terminal block images, and outputting a high-quality feature embedding vector $X_1$ to obtain a trained encoder.

4. The image recognition method for a secondary circuit terminal based on contrastive learning and an improved CRNN according to claim 3, wherein a calculation formula of the loss function is:

$$L_{i,j} = \lambda L_{NT} + (1 - \lambda)L^{sup}$$

where, $L_{i,j}$ is the loss function; $L_{NT}$ is a normalized temperature-scaled cross-entropy loss; $L^{sup}$ is an extended contrastive loss function; and $\lambda$ is a weighting parameter;

a calculation formula of the normalized temperature-scaled cross-entropy loss is:

$$L_{NT} = -\sum_{i=1}^{2N}\log\frac{\exp\left(\frac{sim(z_i \cdot z_{j(i)})}{\tau}\right)}{\sum_{g=1}^{2N}\Gamma_{g\neq1}\cdot\exp\left(\frac{sim(z_i \cdot z_g)}{\tau}\right)}$$

where, $L_{NT}$ is the normalized temperature-scaled cross-entropy loss; N is the total number of samples; $\Gamma(\cdot)$ is a binary function, and is 1 if a condition is met and 0 otherwise; $z_{j(i)}$ is a feature vector homologous to $z_i$; $z_g$ is a different type of feature vector from $z_i$; $\tau$ is a temperature parameter; both i and g are counting units; and $sim(\cdot)$ is cosine similarity;

a calculation formula of the extended contrastive loss function is:

$$L^{sup} = \sum_{i=1}^{2N}\frac{-1}{2N_{y_i}-1}\sum_{j=1}^{2N}\Gamma_{i\neq j}\cdot\Gamma_{y_i=y_j}\cdot\log\frac{\exp\left(\frac{sim(z_i \cdot z_j)}{\tau}\right)}{\sum_{g=1}^{2N}\Gamma_{g\neq1}\cdot\exp\left(\frac{sim(z_i \cdot z_g)}{\tau}\right)}$$

where, $L^{sup}$ is the extended contrastive loss function; $N_{y_i}$ is the number of samples with a label $y_i$, $z_j$ is a feature vector of the same type as $z_i$ but from a different source; i, g, j are all counting units; $\tau$ is the temperature parameter; $\Gamma(\cdot)$ is the binary function, and is 1 if the condition is met and 0 otherwise; and $sim(\cdot)$ is the cosine similarity; and a calculation formula of the cosine similarity is:

$$sim(z_i, z_j) = \frac{z_i^T z_j}{\|z_i\|\|z_j\|}$$

where, $z_i$ and $z_j$ are feature vectors that are output by two projection networks and then normalized.

5. The image recognition method for a secondary circuit terminal based on contrastive learning and an improved CRNN according to claim 3, wherein the step 2 comprises: transferring the trained encoder in the step 1 to an improved CRNN model as an initialization parameter of the feature extraction layer; and optimizing the feature extraction layer by using a residual neural network structure, and continuing supervised training with the contrastive learning loss function $L_{i,j}$ in the step 1 to further enhance a feature extraction capability of the model for the terminal block images and output a feature vector $X_2$.

6. The image recognition method for a secondary circuit terminal based on contrastive learning and an improved CRNN according to claim 5, wherein a calculation formula of a residual unit in the residual neural network in the step 2 is:

$$r_l = p(s_l) + F(s_l, J_l)$$

$$s_{l+1} = R(r_l)$$

where, $s_l$ and $s_{l+1}$ represent an input and an output of an l-th residual unit, respectively; F represents a learned residual; J is a convolution operation; $r_l$ represents the residual unit; p is an identity mapping performed on the input signal $s_l$, R is an activation function of a rectified linear neural network; and $p(s_l) = s_l$ represents an identity mapping; and learned features from a shallow layer l to a deep layer L are:

$$s_L = s_l + \sum_{i=l}^{L-1} F(s_i, J_i)$$

wherein, $s_L$ represents an output of a residual unit in the deep layer L.

7. The image recognition method for a secondary circuit terminal based on contrastive learning and an improved CRNN according to claim 5, wherein a calculation formula of a gradient for a backward process in the residual neural network in the step 2 is:

$$\frac{\partial \text{loss}}{\partial s_l} = \frac{\partial \text{loss}}{\partial s_L} \cdot \frac{\partial s_L}{\partial s_l} = \frac{\partial \text{loss}}{\partial s_L} \cdot \left( 1 + \frac{\partial}{\partial s_l} \sum_{i=l}^{L-1} F(s_i, J_i) \right)$$

where, $$\frac{\partial \text{loss}}{\partial s_l}$$

represents a gradient of the loss function reaching the l, a first factor $$\frac{\partial \text{loss}}{\partial s_L}$$

represents a gradient of the loss function reaching the $$L, \frac{\partial s_L}{\partial s_l}$$

represents a gradient of the deep layer L reaching the shallow layer l, and $$\frac{\partial}{\partial s_l} \sum_{i=l}^{L-1} F(s_i, J_i)$$

represents a gradient of a sum of residuals learned from the layer l to a layer L-1 with respect to the l.

8. The image recognition method for a secondary circuit terminal based on contrastive learning and an improved CRNN according to claim 5, wherein the step 3 comprises: introducing the ECA-Net on the basis of the feature vector $X_2$ output in the step 2, adaptively assigning a weight to each feature channel to obtain an improved feature vector $X_3$, and subjecting the improved feature vector $X_3$ to sequence modeling and context information processing via a recurrent layer of the CRNN to finally complete feature classification and text recognition tasks.

9. The image recognition method for a secondary circuit terminal based on contrastive learning and an improved CRNN according to claim 8, wherein a calculation formula of a channel weight in the efficient channel attention network in the step 3 is:

$$\omega = \sigma(Mq)$$

where, $\omega$ is the channel weight; $\sigma$ is a Sigmoid function; and M is a C×C parameter matrix; and $$\omega = \sigma(C1D_k(q))$$

where, C1D is a 1-dimensional convolution operation; and k is a convolution kernel size.

10. The image recognition method for a secondary circuit terminal based on contrastive learning and an improved CRNN according to claim 8, wherein a calculation formula of the convolution kernel size in the efficient channel attention network in the step 3 is:

$$k = \psi(C) = \left| \frac{\log_2(C)}{\gamma} + \frac{f}{\gamma} \right|_{odd}$$

where, k is the convolution kernel size; $|t|_{odd}$ represents a nearest odd number to t; C is a channel dimension; and both f and $\gamma$ are constants.

11. An image recognition method for a secondary circuit terminal based on contrastive learning and an improved CRNN, comprising:

step 1: pre-training, by a server, sample data of a secondary circuit terminal block of a power system captured by using on-site equipment through the contrastive learning;

step 2: improving, by a server, a feature extraction layer of a Convolutional Recurrent Neural Network (CRNN) by using a residual neural network; and step 3: introducing, by a server, an Efficient Channel Attention Network (ECA-Net) on the basis of the step 2 to construct a recognition model for the secondary circuit terminal based on the contrastive learning and the improved CRNN, wherein the recognition model for the secondary circuit terminal based on the contrastive learning and the improved CRNN is configured to recognize a secondary circuit terminal to be recognized captured by using on-site equipment, wherein the step 1 comprises:

data augmentation: expanding data, by applying cropping, flipping, rotation, random noise adding, random Gaussian blur and color transformation techniques to unlabeled data, wherein data expanded from same-source data are used as similar sample pairs with each other, and remaining data are used as different sample pairs;

encoder network: mapping the similar sample pairs and the different sample pairs to a feature space, extracting a feature capable of distinguishing samples and similarity, and outputting a high-dimensional feature vector through an average pooling layer; and projection network: projecting the high-dimensional feature vector output by the encoder network to a low-dimensional space to obtain a feature vector output by the projection network.

* * * * *